United States Patent
Alstad et al.

(10) Patent No.: US 7,310,578 B2
(45) Date of Patent: Dec. 18, 2007

(54) FAST ACCESS, LOW MEMORY, PAIR CATALOG

(75) Inventors: James P. Alstad, Palos Verdes Estate, CA (US); David D. Needelman, Torrance, CA (US); Rongsheng Li, Hacienda Heights, CA (US); Richard A. Fowell, Rolling Hills Estates, CA (US); Peter C. Lai, Alhambra, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 10/710,177

(22) Filed: Jun. 24, 2004

(65) Prior Publication Data

US 2005/0154528 A1   Jul. 14, 2005

Related U.S. Application Data

(60) Provisional application No. 60/535,258, filed on Jan. 9, 2004, provisional application No. 60/535,721, filed on Jan. 9, 2004.

(51) Int. Cl.
*G06F 7/76* (2006.01)
(52) U.S. Cl. ........................ 701/222; 244/164
(58) Field of Classification Search ............... 701/222; 244/164, 165, 166, 170, 171
See application file for complete search history.

(56) References Cited

U.S. PATENT DOCUMENTS

| | | | | |
|---|---|---|---|---|
| 3,290,933 A | * | 12/1966 | Lillestrand et al. | 73/178 R |
| 4,680,718 A | * | 7/1987 | Sasaki et al. | 701/222 |
| 4,688,091 A | | 8/1987 | Kamel | |
| 4,837,699 A | | 6/1989 | Smay | |
| 4,944,587 A | * | 7/1990 | Harigae | 356/139.01 |
| 5,177,686 A | | 1/1993 | Boinghoff | |
| 5,412,574 A | | 5/1995 | Bender | |
| 5,473,746 A | | 12/1995 | Pritt | |
| 5,508,932 A | * | 4/1996 | Achkar et al. | 701/226 |

(Continued)

OTHER PUBLICATIONS

Kudva, P. and Throckmorton, A. "Preliminary Star Catalog Development for the Earth Observation Systems AMI (EOS-AMI) Mission", AIAA Journal of Guidance, Control and Dynamics, vol. 19, No. 6, pp. 1332-1336, 1996.

(Continued)

*Primary Examiner*—Dalena Tran
(74) *Attorney, Agent, or Firm*—Ostrager Chong Flaherty & Broitman P.C.

(57) ABSTRACT

A system (18) includes: a) A vehicle (12) includes an attitude or angular velocity control system (38), a plurality of star trackers or star sensors (22) each having a field of view (28); b) a memory (30) having a star catalog (32), a star pair catalog (58) and a reference table (56) stored therein; and c) a processor (24) coupled to the attitude or angular velocity control system (38), the star trackers or star sensors (22), and the memory (30). The processor (24) determines the vehicle inertial attitude or angular velocity or sensor alignment, based, in part, on the star pair catalog (58) and reference table (56). The design of the star pair catalog (58) and reference table (56) is suitable for rapid determination of attitude or angular velocity or sensor alignment, and an efficient use of memory.

14 Claims, 3 Drawing Sheets

Reference Table

U.S. PATENT DOCUMENTS

| | | | |
|---|---|---|---|
| 5,745,869 A | | 4/1998 | van Bezooijen |
| 5,831,572 A | * | 11/1998 | Damilano .................. 342/352 |
| 5,878,358 A | | 3/1999 | Parsons |
| 5,935,195 A | * | 8/1999 | Quine ....................... 701/222 |
| 6,012,000 A | | 1/2000 | Holmes |
| 6,108,594 A | | 8/2000 | Didinsky |
| 6,266,616 B1 | | 7/2001 | Needelman |
| 6,289,268 B1 | | 9/2001 | Didinsky |
| 6,324,475 B1 | | 11/2001 | Potteck |
| 6,330,988 B1 | | 12/2001 | Liu |
| 6,362,464 B1 | | 3/2002 | Liu |
| 6,470,270 B1 | | 10/2002 | Needelman |
| 6,478,260 B1 | * | 11/2002 | Rice et al. ................. 244/171 |
| 2003/0058161 A1 | | 3/2003 | Ring |

OTHER PUBLICATIONS

Bone, Jeffery W., "On-orbit Star Processing Using Multi-Star Star Trackers", Apr. 5-8, 1994, SPIE vol. 2221, pp. 6-14.

Wicenec, A.J. and Albrecht, M., "Methods for Structuring and Searching Very Large Catalogs", 1998, Astronomical Society of the Pacific, pp. 512-515.

Barrett, P., "Application of the Linear Quadtree to Astronomical Databases", Astronomical Data Analysis Software and Systems IV, ASP Conference Series, vol. 77, 1995, pp. 1-4.

Strikwerda, Thomas E. and Junkins, John L., "Star Pattern Recognition and Spacecraft Attitude Determination", May 1981, US Army ETL.

Ju, Gwanghyoek and Lee, Sang Kee, "Attitude Determination for Kompsat-2Using Star Identification Technique", AAS 02-100, pp. 1-17.

Heide, E.J.v.d., Kruijff, M., Douma, S.R. and Lansink, D. Oude, "Development and Validation of a Fast and Reliable Star Sensor Algorithm with Reduced Data Base", IAF-98.A.6.05, pp. 1-13.

Potteck, S., "A Star Recognition Algorithm Based on Star Groups and Associated Means", aAAS 99-011, pp. 87-94.

Mortari, Daniele, Junkins, John L. and Samaan, Malak A., "Lost-In-Space Pyramid Algorithm for Robust Star Pattern Recognition", AAS 01-004, pp. 1-20.

Mortari, Daniele, "Search-Less Algorithm for Star Pattern Recognition", pp. 179-194.

Mortari, Daniele, "A Fast On-Board Autonomous Attitude Determination System Based on a New Star-ID Technique for a Wide FOV Star Tracker", AAS 96-158, pp. 893-903.

Elstner, Ch., Wunder, D., "Autonomous Attitude Determination".

Baldini, D., Barni, M., Foggi, A., Benelli, G., Mecocci, a., "Star-Configuration Searching for Satellite Attitude Computation".

Udomkesmalee, Suraphol, Alexander, James W., Tolivar, Aurelio F., "Stochastic Star Identification".

Ju, Gwanghyeok; Kim, Hye-Young; Pollock, Thomas C.; Junkins, John L.; "Lost-In-Space: A Star Pattern Recognition and Attitude Estimation Approach for the Case of No Prior Attitude Information", AAS-00-004, Feb. 2-6, 2000; pp. 1-16.

Samaan, Malak A.; Mortari, Daniele; Junkins, John L.; "Recursive Mode Star Identification Algorithms", AAS-01-149, Feb. 2001, pp. 1-18+.

Shucker, B., Fasse, E.D., "A Ground-Based Prototype of a CMOS Navigational Star Camera for Small Satellite Applications", 15th AIAA/USU Conference on Small Satellites.

Ju, G., Kim, H., Pollock, T., and Junkins, J.L., "Digistar: A Low Cost Micro Star Tracker", AIAA Space Technology Conference & Exposition, Sep. 1999.

Kim, H., Junkins, J.L., and Mortari, D., "A New Star Pair Pattern Recognition Method: Star Pair Axis and Image Template Matrix Method".

* cited by examiner

| Bucket No. | Starting index of each bucket 112 | No. of pair record 114 | No. of total space in each bucket 116 |
|---|---|---|---|
| 1 | Idx$_1$ | n$_1$ | N$_1$ |
| 2 | Idx$_2$ | n$_2$ | N$_2$ |
| 3 | Idx$_3$ | n$_3$ | N$_3$ |
| 4 | Idx$_4$ | n$_4$ | N$_4$ |
| ⋮ | ⋮ | ⋮ | ⋮ |
| m-1 | | | |
| m | Idx$_m$ | n$_m$ | N$_m$ (optional) |

Reference Table

FIG.5

| Bucket No. | Starting index of each bucket 112' | Pair recorded ending index 114' | Ending index in a bucket 116' |
|---|---|---|---|
| 1 | Idx$_1$ | i$_1$ | I$_1$ |
| 2 | Idx$_2$ | i$_2$ | I$_2$ |
| 3 | Idx$_3$ | i$_3$ | I$_3$ |
| 4 | Idx$_4$ | i$_4$ | I$_4$ |
| ⋮ | ⋮ | ⋮ | ⋮ |
| m-1 | | | |
| m | Idx$_m$ | i$_m$ | I$_m$ (optional) |

Reference Table

FIG.6

FAST ACCESS, LOW MEMORY, PAIR CATALOG

CROSS REFERENCE TO RELATED APPLICATIONS

The present invention is related to U.S. Provisional Patent Application 60/535,258 filed Jan. 9, 2004, entitled "Fast Access Pair Catalog", and U.S. Provisional Patent Application 60/535,721 filed Jan. 9, 2004, entitled "Algorithm Design For Onboard Autonomous Pair Catalog Generation", that are incorporated by reference herein.

FEDERAL RESEARCH STATEMENT

This invention was made with Government support. The Government has certain rights in this invention.

BACKGROUND OF INVENTION

The present invention relates generally to attitude or angular velocity or sensor alignment estimate adjustment for a vehicle, and more particularly, to algorithms involving attitude or angular velocity or sensor alignment determination, using star position measurements.

Satellites and other vehicles are in widespread use for various purposes including scientific research and communications. Many scientific and communications missions, however, cannot be accurately fulfilled without consistently monitoring and controlling the 3-axis attitude and angular velocity of the vehicle. Attitude may be described as the vehicle orientation with respect to some frame, for example, the Earth-Centered Inertial (ECI) frame. In many applications, the vehicle must be oriented to transmit signals in particular directions or to receive signals from specifically located sources. Furthermore, in such a situation, the vehicle angular velocity must be such so as to maintain the desired orientation, over time. Without accurate control over vehicle 3-axis attitude and angular velocity, the transmission or reception of such signals is hindered and at times impossible.

Such control requires systems for 3-axis attitude and angular velocity determination, which generally include one or more star trackers or star sensors, and a 3-axis gyroscope. During normal operation, star trackers or star sensors provide attitude-related information and the 3-axis gyroscope provides angular velocity information. As there are inherent, and time-varying, errors from star trackers, star sensors, and gyros, it is often necessary to constantly estimate such errors, in order to compensate for them. One common method of doing so is to correlate star tracker or sensor position measurements of stars with known positions of the same stars, as listed in a star catalog, or database. Discrepancies between the measured and predicted positions allow direct estimation of tracker error, and indirect estimation of gyro error. Knowing such errors allows estimation of attitude or angular velocity, or refinement of existing estimates. Furthermore, if there are multiple star trackers or star sensors on-board, such correlations allow determination of the alignment of such trackers or sensors, with respect to each other; such determination yields greater accuracy in future attitude and angular velocity estimates.

Upon initialization, procedures such as described above often require a method for obtaining a coarse estimate of attitude, where, for example, attitude is considered to be the orientation of the vehicle with respect to the ECI frame. Typically, this method includes two steps. The first step is to identify stars detected by one or more of the star trackers or star sensors as known stars from an astronomical database. A star catalog, which is an astronomical database or portion thereof, is used for this purpose. Each entry of the star catalog contains information about a particular star, such as the star's position in the ECI frame. Each entry is associated with a star catalog index, allowing a user to locate the entry. The second step of the method is to use the following to obtain the vehicle attitude: the knowledge of the stars' positions with respect to some frame, which is represented in the database; the knowledge of the stars' positions in the star tracker frame, which is output by the star tracker or star sensor; and the knowledge of the alignment of the star sensor or tracker with respect to the vehicle body.

A star pair database, also referred to as a pair database, or a pair catalog database, may be used to aid in the identification procedure of the first step of the method described above. The star pair database contains a reference table, and a star pair catalog, also referred to as a pair catalog. The reference table is to aid in accessing entries from the star pair catalog. Each entry of the star pair catalog represents a pair of stars, where each star in the pair is represented in the star catalog. All possible star pairs may not be represented; for such a design, there exist criteria to decide which star pairs are to be represented in the pair catalog. Such criteria may be based upon, for example, magnitude of stars in the pair, or angular separation between the stars forming the pair.

As will be recognized by those skilled in the art, the star pair database may be used in a multitude of ways to aid the identification procedure of the first step of the method described above. For example, in a situation where a vehicle of an unknown attitude includes a star tracker or star sensor which detects a pair of stars, separated by a measurable angular separation, a pair catalog can help in the identification process. (The method for determining angular separation from tracker or sensor measurements is described later in this application.) For use in such a situation, the pair catalog would be designed so that the entries would be ordered by separation angle, the angular separation between the stars forming the pair, as measured by the star sensor or star tracker on the vehicle. Should the detected star pair be a pair represented in the pair catalog, its representation would be in an easily determined section. This is because the detected star pair has an angular separation equal to the separation measured by interpretation of the star tracker or star sensor data, plus or minus instrument error. As instrument error is typically small, this reduces the number of possible matches between the detected star pair and the cataloged star pair from, for example, several thousand to perhaps a dozen or two. Other techniques may be used to determine which of the remaining pair catalog entries actually represents the detected pair.

Pair catalog databases typically reside within other coding, which makes them very complicated and lengthy. Debugging and maintenance are difficult and code reusability is low. Therefore, it would be desirable to simplify the data structure of the pair catalog database. It would be desirable to design the pair catalog database so as to facilitate access to the entries contained therein.

SUMMARY OF INVENTION

In many cases, the efficiency of the method described above depends on a well-designed pair database. Key requirements for efficient pair database design include: ability to rapidly access star pairs from the pair catalog, given specific criteria describing the pairs, and efficient use of processor memory for storage of the pair database. The present invention is of a pair database design meeting such requirements.

In one aspect of the invention, a pair database design includes the use of a reference table to determine location of entries within the catalog.

In a further aspect of the invention, a vehicle includes an attitude or angular velocity control system, a star tracker having a field of view, a star database having a star catalog stored therein, and a star pair database, having a star pair catalog and reference table stored therein. A processor is coupled to the attitude or angular velocity control system, the star tracker, the star database, and the star pair database. The processor calculates an estimation of the vehicle inertial attitude or angular velocity, based, in part, on values represented in the star pair catalog.

One advantage of the invention is that the pair database memory required is significantly less than that required for previous designs. A further advantage is that the time required to locate a pair catalog entry is less than the time required by previous designs.

Other aspects and advantages of the present invention will become apparent upon the following detailed description and appended claims, and upon reference to the accompanying drawings.

BRIEF DESCRIPTION OF DRAWINGS

FIG. 5 is a reference table associated with the pair catalog of FIG. 4.

FIG. 6 is an alternative reference table associated with the pair catalog of FIG. 4.

DETAILED DESCRIPTION

Figure 1:
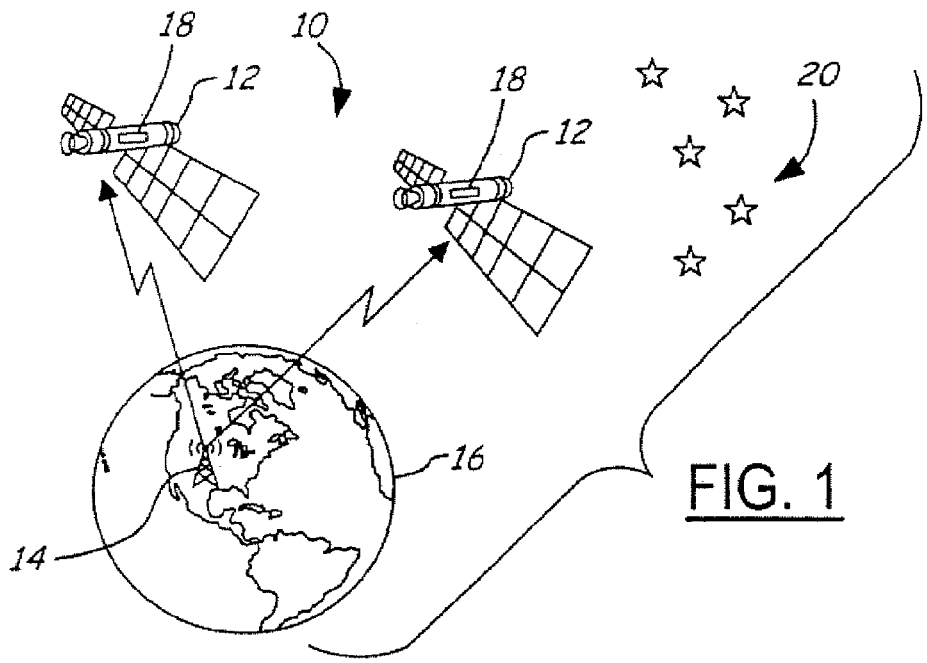
FIG. 1 is a perspective view of a set of vehicles (depicted as a satellite system, in accordance with the preferred embodiment of the present invention) for determining stars in a star tracker field of view.

In the following figures the same reference numerals will be used to identify the same components. The present invention is described with respect to a pair catalog database, for a vehicle. It should be noted that various types of vehicles may benefit from the system.

Referring to FIG. 1, a perspective view of a system 10 for determining stars in a star tracker field of view (FOV) in accordance with one embodiment of the present invention is illustrated. The system 10 is comprised of one or more vehicles 12. Although not required, the system may also be in communication with a station 14 on earth 16. Each vehicle 12 includes an apparatus 18 for determining or controlling inertial attitude or angular velocity based upon measurements of positions of a plurality of stars 20. The vehicle 12 may be one of various types of vehicles, including satellites or other spacecraft.

Figure 2:
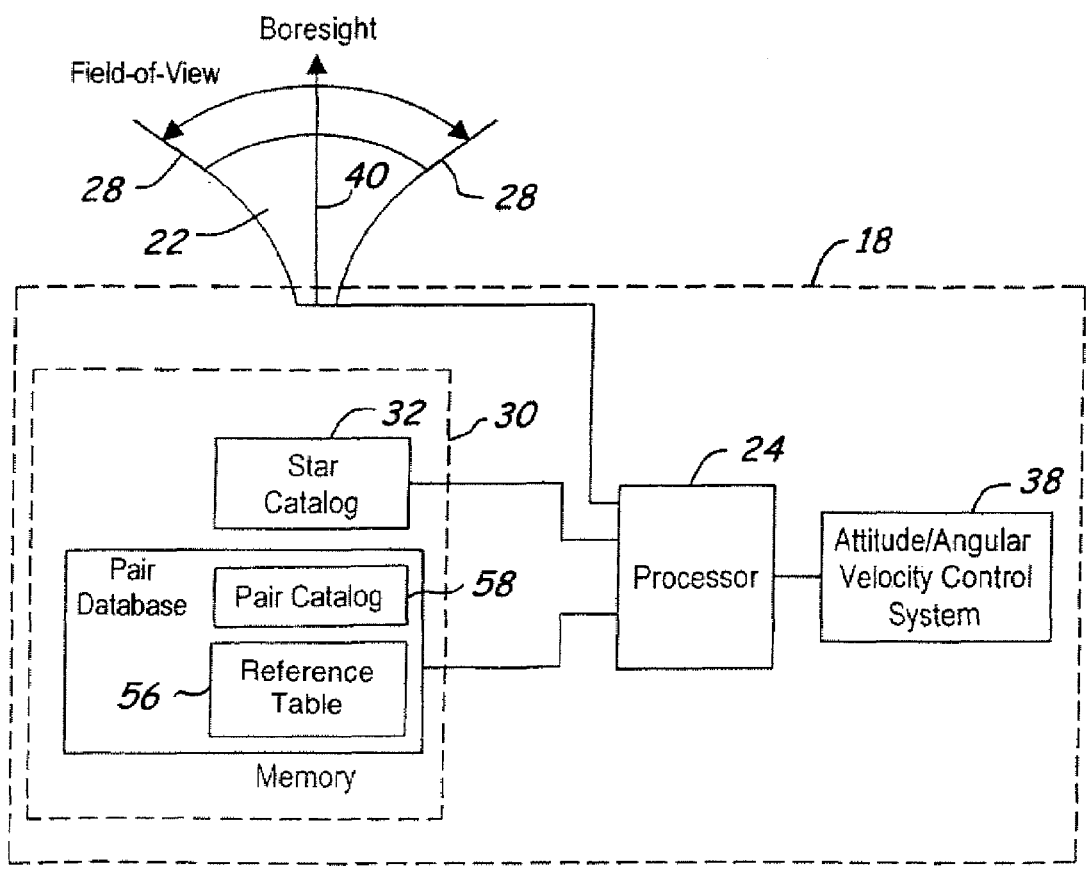
FIG. 2 is a block diagram of an apparatus for controlling a vehicle in accordance with the preferred embodiment of the present invention.

Referring to FIG. 2, a block diagram of apparatus 18 for determining or controlling attitude or angular velocity for a vehicle in accordance with one embodiment of the present invention is illustrated. Apparatus 18 includes one or more star trackers or star sensors 22, and a processor 24. Apparatus 18 also includes a memory 30 that includes a star catalog 32, a star pair catalog 58, and a reference table 56. The processor 24 may also be coupled to an attitude or angular velocity control system 38. The processor 24 and memory 30 need not be physically on the vehicle 12; either may be, for example, at the ground station 14.

Star tracker 22 is mounted to the vehicle 12 and transmits data to processor 24 in a conventional manner. Star tracker 22 includes a field of view (FOV) 28 and a boresight 40 in the FOV 28. Star tracker 22 is used to sense a plurality of positions, relative to star tracker 22, of a plurality of stars 20. Star tracker 22 then generates a plurality of signals corresponding to the plurality of star positions in the FOV 28. It should be noted that more than one star tracker 22 might be included on a vehicle.

Processor 24 may be an individual processor or may be comprised of a plurality of processors. For example, star tracker 22 may include its own processor. Likewise, attitude or angular velocity control system 38 may also comprise its own processor such as a spacecraft control processor (SCP). For simplification purposes the processor is illustrated as a single component. Each processor may be microprocessor-based. Processor 24 is coupled to star tracker 22 and receives the plurality of signals corresponding to the plurality of star positions in the FOV 28. Processor 24 provides control logic operative to select at least one of the plurality of signals corresponding to the positions of one or more stars. Processor 24 might use star catalog 32 to determine which stars 20 to select. Processor 24 might be used to implement a method as described above to determine which entries in star catalog 32 correspond to the one or more stars detected by star sensor or star tracker 22.

Memory 30 is illustrated as a plurality of separate elements. Those skilled in the art will recognize that the memory may comprise a single or multiple memory system. It should also be noted that if a microprocessor is used for processor 24 that the microprocessor may include memory therein. The memory may include various types of memory including but not limited to random access memory (RAM).

The attitude or angular velocity control system 38 may comprise a plurality of actuators, for example thrusters or momentum wheels, as will be evident to those skilled in the art. The attitude or angular velocity control system 38 controls the actuators used to orient the vehicle to the desired attitude.

Figures 3, 4:
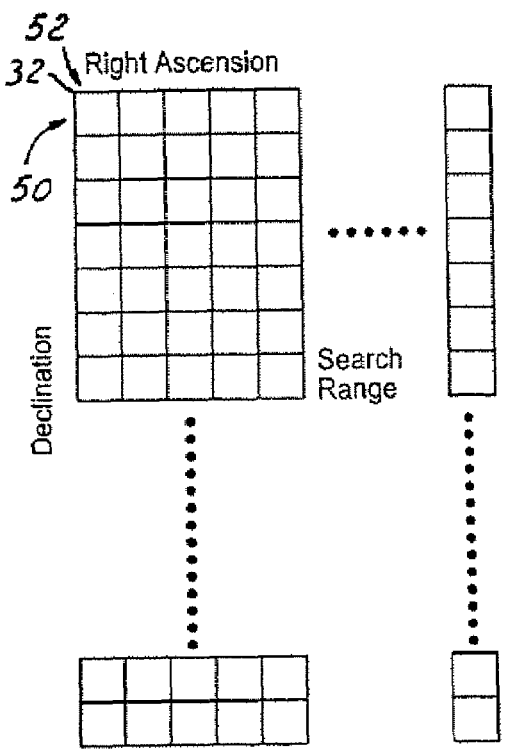
FIG. 3 is an illustration of a star catalog according to the present invention.
FIG. 4 is a representation of a pair catalog according to the present invention.

Referring now to FIG. 3, an example of a simplified database, star catalog or sub-catalog 32 is illustrated. Each entry in catalog or sub-catalog 32 may include associated star information. Star catalog 32 is illustrated having rows 50 and columns 52. The rows correspond to declination and the columns correspond to the right ascension. Thus, each square represents a star with a specific right ascension and declination. In one embodiment of the invention, the pair catalog may reference the stars that comprise star pairs by referencing the location of the corresponding entries in the star catalog.

As mentioned above, entries in traditional pair catalogs are usually ordered by separation angle between two stars. A time-consuming binary search is required to determine indices of pair catalog entries representing star pairs with separations in a specified range. Alternatives to binary searching include the so-called K-vector method in which the pairs are sorted by cosine of separation angle. Since the relation of the pair separation to the index is almost proportional, the pair can be accessed directly by separation without a search. A similar method using sine separation has also been proposed. Further, a piece-wise non-linear separation sorting method has also been proposed. However, none of the previous pair catalog designs allow easy access and easy maintenance.

Referring now to FIG. 4, an alternative pair catalog 58' to that described above is illustrated. In this embodiment, groups of entries are stored in memory locations; the locations of any single group are referred to as a "bucket." The plurality of buckets labeled 1-$m$ each correspond to a row in the figure. The decision of which entries fall into which bucket is made according to a metric or characteristic associated with each star pair catalog entry.

In the preferred embodiment, the metric is related to the separation angle, the angular separation between the stars forming the pair, as determined by star sensor or star tracker measurements. The metric chosen, for example, may be the separation angle itself, or some function of the separation angle. A particularly useful metric is a quadratic function of the angular separation between the two stars forming the pair, since bucketing star pairs in buckets with a uniform spacing in such a quadratic function tend to have approximately equal numbers of pairs in each bucket. Herein, a quadratic function of the angular separation, theta, is taken to mean a metric whose derivative with respect to theta are approximately linear for small angles. Exemplary quadratic functions include theta $\hat{0}2$, cos (theta), 1-cos (theta), sin $\hat{0}2$ (theta), tan $\hat{0}2$ (theta) as well as second-order polynomials in theta, sin (theta) and tan (theta).

Each bucket has a plurality of entries 102 that may include spares 104; spares or spare entries are entries that do not represent star pairs. Spares may be used, for example, to ensure that each pair bucket contains the same numbers of entries, regardless of how many star pairs are actually in the bucket. As will be further described below, the pair buckets may be uniformly distributed which may reduce the need for spares. However, spares may also be provided in a uniformly distributed table. Each space in the figure corresponds to a pair catalog entry, or pair record, for each star pair represented that may contain the star catalog indices of the two stars. Alternatively, the pair record may include a star catalog index of the first star, and a value representing the location, in the star catalog, of the second star, with respect to the location of the first star. It should be noted that in this embodiment no sorting is required for pair entries residing in the same bucket, which saves time during pair catalog generation. It should also be noted that an entry in the pair catalog of the present invention need not include the separation angle, and thus the amount of memory required for the pair database is reduced.

Referring now to FIG. 5, a reference table 110 is illustrated. Reference table 110 allows fast access for referencing sets of entries in the pair catalog. When a user needs to know which pair catalog entries refer to star pairs with an associated metric within a certain range, reference table 110 is used to determine the starting and ending pair buckets. Each of the reference table entries corresponds directly to a pair catalog bucket. The bucket associated with the metric at one end of the desired range will be the starting bucket, while the bucket associated with the metric at the other end of the desired range will be the ending bucket. The desired pair catalog entries will be those between the starting and ending buckets (inclusive).

For the reference table shown in FIG. 5, each reference table entry contains: a first element 112 corresponding to the starting index, in the pair catalog, of the associated bucket; a second element 114 corresponding to the number of pair catalog entries in the bucket; and a third element 116 corresponding to the number of pair catalog entries plus spares, in that bucket. If each of the buckets is of the same size, the element 116 may be eliminated since the number of spaces would previously be known. Alternatively, if the pair catalog entries are placed in memory consecutively, so that the numbers of pair catalog entries plus spares for a given bucket may be deduced from the starting indices of the bucket, and the next bucket, element 116 may again be eliminated. (For the latter case, provision would have to be made for calculation of size of the final bucket.) Furthermore, if provision is made so that referencing a spare entry will not cause problems with the invoking software, the second element 114 may likewise be eliminated.

Referring now to FIG. 6, an alternative reference table 110' is illustrated. In this embodiment, a starting pair catalog index of each bucket is provided by 112'. A pair catalog index, referring to the final pair catalog entry in the bucket, is provided in the second column space 114'. In space 116', the ending index in the pair catalog of the bucket is provided. Thus, the starting index of each bucket and the pair record ending index is provided so that the length of the bucket without the spares is known. By providing the ending index in a bucket the pair catalog bucket length is known by including the information in space 116'. As before, under analogous conditions, the second element 114" or third element 116" may be eliminated.

Effective use of the pair catalog to identify detected stars as corresponding to star catalog entries, and hence to determine vehicle attitude or angular velocity, or sensor alignment, relies on the ability to compute the metric associated with each pair. Similarly, in generating the pair catalog, the metric must also be calculable from data given. In the preferred embodiment, this metric is a function of angular separation between stars detected by the star sensor or star tracker, or stars forming a pair represented in the pair catalog. For example, there are various methods for calculating the angular separation between the stars forming a pair, for either detected stars or stars corresponding to star catalog entries. Typically, such methods begin with a step in which the star positions of the stars forming the pair are represented as vectors, with respect to the same frame. The procedure for doing so varies, depending on whether the goal is to determine vectors for detected stars, or stars corresponding to star catalog entries.

For detected stars, typically, the star tracker or star sensor reports observed position of a star with respect to pixels on a charge-coupled device (CCD), for example, a horizontal and vertical position with respect to the tracker boresight. To compute the separation between two observed stars in pixel-based star trackers, one can convert the observed position of each star from star tracker pixel space to vectors. The star horizontal and vertical pixel positions Hi and Vi are mapped to the vector to the ith star in the star tracker frame, vi=[Hi, Vi, F]. Sometimes the units of Hi and Vi are chosen so that F=1.

For star catalog entries, the entry may include corresponding star position, expressed as a vector, with respect to the ECI frame. Alternatively, if the star position is represented using right ascension and declination, as in FIG. 3, a vector may be derived from those quantities. This procedure is discussed extensively in the literature, for example, in Section 2.11 of "Fundamentals of Astrodynamics", by R. R. Bate, D. D. Mueller, and J. E. White (Dover Publications, Inc., New York, 1971).

The angular separation between stars, whose positions are represented by vectors Va and Vb, can then be found from the cosine or sine of the angular separation. The cosine or sine of the separation angle, theta, may be determined from the following relations between the dot product and/or cross product between the two star vectors and the magnitudes of the star vectors:

$$Va.dot.Vb=|Va||Vb|\cos(theta)$$

$$|Va.cross.Vb|=|Va||Vb|\sin(theta),$$

where dot is the dot product and cross is the cross product.

The magnitude of a vector can be determined by taking the square root of the dot product of the vector with itself. The prior-art separation measures cos(theta), sin(theta) and theta using these relationships all require the evaluation of one or more transcendental functions such as sqrt(x), acos(x) and/or asin(x)).

The separation metric cos (theta) is often suggested, since it is a quadratic function which is easily computed from the dot product. However, storing this metric in the catalog requires more memory than necessary. This is because for small angles, this metric is nearly equal to one, and a large number of digits must be stored in memory to accurately distinguish amongst small angles. For wide field of view trackers, this is mitigated by setting a minimum usable separation, but for small angles, this is a problem. This can be obviated by using the metric 1-cos (theta), and storing this in floating point form. Since this metric is nearly zero for small angles, it is efficiently represented in floating point format.

In contrast, the separation metric $(\sin(theta))\hat{0}2$ does not require evaluation of transcendental functions, has the useful property that the number of star pairs per equal increment of separation metric is nearly uniform for the relatively small separation angle that are frequently of interest. This property is shared by any separation metric whose derivative with respect to theta is nearly proportional to theta for small theta, such as cos(theta), theta $\hat{0}2$ and other metrics that are quadratic with theta.

Two convenient formulas for computing the separation metric $(\sin(theta))\hat{0}2$ are:

$$(\sin(theta))\hat{0}2=1 \ (Va.dot.Vb)\hat{0}2/(Va.dot.Va) \ (Vb.dot.Vb)) \text{ and}$$

$$(\sin(theta))\hat{0}2=A.dot.A/((Va.dot.Va)(Vb.dot.Vb)),$$

where A=Va.cross.Vb.

The advantage of the second formula is that it avoids the issue of the poor numerical conditioning of cos(theta) for small theta that the first formula shares with the prior art cos(theta) separation metric.

The $(\sin(theta))\hat{0}2$ metric is discussed in the paper "Attitude Determination for Kompsat-2 Using Star Identification Technique" under the name "Interstar-Sine Method." Equation (2) of this paper also gives an efficient implementation of the second formula above that takes advantage of the fact that the term $F\hat{0}2$ can be precomputed once and reused several times for each computation of the measured separation star metric.

The present invention allows the star inertial attitude determination algorithm to rapidly find pairs in the pair catalog. Speed for accessing the pair catalog in a vehicle is desirable. The present method may be used to design a pair catalog, which, in turn, may be used by lost-in-space (LIS) attitude determination, or procedures for determination of angular velocity. The access time is reduced using the reference table to rapidly determine the bucket of interest; the memory allocation is reduced by not requiring storage of the metric associated with each pair. Thus, the processor uses both the reference table and the star pair catalog in executing the procedure for determining the vehicle inertial attitude or angular velocity.

Based on star sensor measurements of the positions of stars found to correspond to entries listed in the star catalog or sub-catalog, and pairs of stars found to correspond to entries listed in the pair catalog, the vehicle inertial attitude estimate or angular velocity estimate is determined or refined. The attitude is controlled to orient the vehicle as desired, or the angular velocity is controlled to maintain the desired attitude over time. Other considerations such as vehicle gyros such as 3-axis gyros may also be taken into consideration.

It should be noted that the steps described above might be performed on the vehicle, or on the ground. There are advantages to either approach. Performing steps on the vehicle avoids problems caused by timing and errors due to the transmission and reception of the information from a ground station. Performing steps on the ground avoids problems due to limited computational resources on the vehicle.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A star pair database for use with a database having a star catalog comprising:
   a reference table, wherein the reference table comprises a plurality of reference table entries, each directly or indirectly specifying a bucket, said bucket defining a plurality of memory locations in the pair catalog, for which pair catalog entries corresponding to star pairs with certain properties reside, wherein each of the plurality of reference table entries comprises a starting star pair catalog index of the associated pair catalog bucket and a number of pair records in the associated pair catalog bucket, and wherein each of the plurality of reference table entries comprises a total number of available memory locations, each capable of storing a representation of a star pair, in the associated pair catalog bucket, said reference table describing the specified locations in the star pair catalog of entries representing star pairs meeting specific criteria; and
   a star pair catalog containing references to pairs of stars based on the reference table and on properties of stars listed in the star database,
   wherein the star pair catalog comprises an ordered list of a plurality of entries, such that:
   each entry comprises a reference to a first star, selected from stars represented in the star catalog;
   each entry comprises a reference to a second star, selected from stars represented in the star catalog;
   an ordering of the entries is based on the value of a metric associated with each entry, where the value of the said metric may optionally be included in the entry.

2. A star pair database as recited in claim 1 wherein each of the plurality of reference table entries comprises a star pair catalog ending index of the associated pair catalog bucket.

3. A star pair database as recited in claim 1 wherein each entry in the star catalog represents a star.

4. A star pair database as recited in claim 3 wherein each entry in the star catalog comprises a value dependent on magnitude of the associated star.

5. A star pair database as recited in claim 4 wherein the selection of a star to serve as first star is based on the value, from the star catalog entry, dependent on the magnitude of the star.

6. A star pair database as recited in claim 4 wherein the selection of a star to serve as second star is based on the value, from the star catalog entry, dependent on the magnitude of the star.

7. A star pair database as recited in claim 1 wherein the selection of a pair of stars to be represented as a pair catalog entry is based on the value of the metric associated with each pair, as calculated for the pair.

8. A star pair database as recited in claim 1 wherein the metric associated with each star pair is specified to be a metric whose value is based on the angular separation between the two stars forming the pair.

9. A star pair database as recited in claim 8 wherein the metric comprises the angular separation between the two stars forming the pair.

10. A star pair database as recited in claim 1 wherein a star pair representation in the star pair catalog comprises the star catalog indices of the first and second stars forming the star pair.

11. A star pair database as recited in claim 1 wherein the star representation in the star pair catalog comprises the star catalog index of the first star and a value describing the star catalog location of the representation of the second star, with respect to the star catalog location of the representation of the first star.

12. A star pair database as recited in claim 1 wherein the value of the metric associated with a predetermined star pair is used to determine a reference table entry which specifies a "bucket", a set of potential pair catalog locations for the genertaed star pair.

13. A star pair database for use with a database having a star catalog comprising:
   a reference table describing the specified locations in the star pair catalog of entries representing star pairs meeting specific criteria; and
   a star pair catalog containing references to pairs of stars based on the reference table and on properties of stars listed in the star database,
   wherein the star pair catalog comprises an ordered list of a plurality of entries, such that: each entry comprises a reference to a first star. selected from stars represented in the star catalog;
   each entry comprises a reference to a second star, selected from stars represented in the star catalog;
   an ordering of the entries is based on the value of a metric associated with each entry, where the value of the said metric may optionally be included in the entry,
   wherein the metric associated with each star pair is specified to be a metric whose value is based on the angular separation between the two stars forming the pair,
   and wherein the metric comprises at least one member selected from the group consisting of:
   quadratic function of the angular separation between the two stars forming the pair;
   the cosine or sine of the angular separation between the two stars forming the pair;
   a polynomial function of the angular separation between the two stars forming the pair;
   the square of the sine of the angular separation between the two stars forming the pair;
   one minus the cosine of the angular separation between the two stars forming the pair; and
   a sin ^2 of the angular separation between the two stars forming the pair.

14. A method for determining the location of a plurality of pair catalog entries within the pair catalog comprising:
   determining the metric associated with each pair catalog entry whose location is desired;
   determining the reference table entry associated with the metric;
   locating the pair catalog entry desired by searching in the pair catalog bucket specified by the reference table entry.

* * * * *